United States Patent
Mun et al.

(10) Patent No.: US 10,224,992 B2
(45) Date of Patent: Mar. 5, 2019

(54) APPARATUS AND METHOD FOR FORMING BEAM IN WIRELESS COMMUNICATION SYSTEM

(71) Applicants: SAMSUNG ELECTRONICS CO., LTD., Suwon-si (KR); KOREA NATIONAL UNIVERSITY OF TRANSPORTATION INDUSTRY-ACADEMIC COOPERATION FOUNDATION, Chungju-si (KR)

(72) Inventors: Cheol Mun, Chungju-si (KR); Youn-Sun Kim, Seongnam-si (KR); Hyoung-Ju Ji, Seoul (KR); Hyo-Jin Lee, Suwon-si (KR)

(73) Assignees: Samsung Electronics Co., Ltd. (KR); Korea National University of Transportation Industry-Academic Cooperation Foundation (KR)

(*) Notice: Subject to any disclaimer, the term of this patent is extended or adjusted under 35 U.S.C. 154(b) by 0 days.

(21) Appl. No.: 14/785,591

(22) PCT Filed: Apr. 17, 2014

(86) PCT No.: PCT/KR2014/003337
§ 371 (c)(1),
(2) Date: Oct. 19, 2015

(87) PCT Pub. No.: WO2014/171753
PCT Pub. Date: Oct. 23, 2014

(65) Prior Publication Data
US 2016/0072568 A1   Mar. 10, 2016

(30) Foreign Application Priority Data
Apr. 17, 2013 (KR) .................. 10-2013-0042297

(51) Int. Cl.
*H04B 7/06* (2006.01)
*H04B 15/00* (2006.01)
(Continued)

(52) U.S. Cl.
CPC ......... *H04B 7/0617* (2013.01); *H04B 7/0619* (2013.01); *H04B 15/00* (2013.01);
(Continued)

(58) Field of Classification Search
CPC .... H04B 7/0617; H04B 7/0619; H04B 15/00; H04W 16/28; H04L 1/0026; H04L 1/06
See application file for complete search history.

(56) References Cited

U.S. PATENT DOCUMENTS

2004/0143428 A1    7/2004  Rappaport et al.
2009/0247200 A1*  10/2009  Hwang .................. H04B 7/022
                                                                    455/507

(Continued)

FOREIGN PATENT DOCUMENTS

WO    2011040773    4/2011
WO    2013013954    1/2013

OTHER PUBLICATIONS

International Search Report of PCT/KR2014/003337 dated Jul. 17, 2014.
(Continued)

*Primary Examiner* — David B. Lugo
(74) *Attorney, Agent, or Firm* — The Farrell Law Firm, P.C.

(57) ABSTRACT

The present invention proposes an apparatus and a method capable of forming M*N number of beams by a base station, which supports signal transmission/reception of the macro service area in heterogeneous networks in which a macro service area is formed with the M*N number of beams through a two-dimensional arrangement simultaneously
(Continued)

considering the horizontal dimension and the vertical dimension and at least one small service is formed in the macro service area. To this end, at least one interference prediction beam formed to transmit signals interfering in transmission signals in at least one small service area from among the signals to be transmitted by the M*N number of beams is selected, and each of the M*N number of beams is formed in consideration of the inter-cell interference in at least one small service area due to the signals to be transmitted by at least one selected interference prediction beam.

4 Claims, 5 Drawing Sheets (51) Int. Cl.
H04L 1/00 (2006.01)
H04L 1/06 (2006.01)
H04W 16/28 (2009.01)
(52) U.S. Cl.
CPC .............. *H04L 1/0026* (2013.01); *H04L 1/06* (2013.01); *H04W 16/28* (2013.01)

(56) References Cited

U.S. PATENT DOCUMENTS

| 2012/0188904 | A1 | 7/2012 | Koo et al. | |
| 2013/0194950 | A1* | 8/2013 | Haghighat | H04W 24/02 370/252 |
| 2015/0016379 | A1* | 1/2015 | Nam | H04B 7/0456 370/329 |
| 2015/0189568 | A1* | 7/2015 | Stanze | H04B 7/0417 370/331 |

OTHER PUBLICATIONS

ITRI, "Interference Coordination with UE-Specific Elevation Beamforming", R1-130336, 3GPP TSG-RAN WG1 #72, St. Julian's,Malta, Jan. 28-Feb. 1, 2013, pp. 1-3.
ZTE, "Mechanism for Interference Avoidance and Coordination in Small Cell Scenarios", R1-130135, 3GPP TSG RAN WGl Meeting #72, St. Julian's, Malta, Jan. 28-Feb. 1, 2013, pp. 1-7.
Mediatek Inc., "Methods for Interference Avoidance in Small Cell Enhancements", R1-130224, 3GPP TSG RAN WGl Meeting #72, St. Julian's, Malta, Jan. 28-Feb. 1, 2013, pp. 1-7.

* cited by examiner

APPARATUS AND METHOD FOR FORMING BEAM IN WIRELESS COMMUNICATION SYSTEM

CROSS-REFERENCE TO RELATED APPLICATIONS/INCORPORATION BY REFERENCE

This application is a 371 of International Patent Application No. PCT/KR2014/003337, filed Apr. 17, 2014, entitled "APPARATUS AND METHOD FOR FORMING BEAM IN WIRELESS COMMUNICATION SYSTEM", which claims priority to Korean Patent Application No. 10-2013-0042297, filed Apr. 17, 2013, entitled "APPARATUS AND METHOD FOR FORMING BEAM IN WIRELESS COMMUNICATION SYSTEM". The above-identified applications are hereby incorporated herein by reference in their entirety.

BACKGROUND

The present disclosure relates to an apparatus and a method for beamforming in a wireless communication system having a two dimensional plane antenna array.

As a core communication technology in a next generation wireless communication system, a massive Multiple-Input Multiple-Output (MIMO) technology is being researched. In the massive MIMO technology, a base station using a large number (e.g., hundreds) of transmission antennas supports a multi-user based on a MIMO technology.

In theory, a transmit beam forming gain is in proportion to the number of transmission antennas. Accordingly, a massive MIMO system uses a high beamforming gain, so that each transmission antenna may use low transmission power. Therefore, the massive MIMO technology is being magnified as a main technology of green communication.

Particularly, as a cell becomes smaller in a wireless communication system, research on the massive MIMO system (hereinafter, referred to as a "planar massive MIMO system") using a two dimensional planar array antenna is actively being progressed. According to the planar massive MIMO system, an increase in capacity by two dimensional beamforming and Space Division Multiple Access (SDMA) in a horizontal dimension and a vertical dimension is possible.

The planar massive MIMO system supports two dimensional beamforming. The two dimensional beamforming by the planar massive MIMO system minutely divides service areas corresponding to all cells two-dimensionally, and may selectively transmit or may not transmit a signal to each of the divided areas.

Further, as another core communication technology in the next generation wireless communication system, many researches on Heterogeneous Networks (HetNet) which can increase spectral efficiency are being progressed. The heterogeneous networks has, for example, a structure in which a service area by at least one small eNB (hereinafter, referred to as a "small service area") overlaps a service area by a macro eNB (hereinafter, referred to as a "macro service area"). That is, in the structure, a small cell corresponding to at least one small service area overlaps a large cell corresponding to the macro service area.

However, the increase in the spectral efficiency in the heterogeneous network is limited by Inter-Cell Interference (ICI) between the macro eNB and the small eNB. Accordingly, for the increase in the spectral efficiency in the heterogeneous network, it is required to develop a technology to effectively avoid the ICI.

DETAILED DESCRIPTION

Embodiments of the present invention disclose an apparatus and a method for performing beamforming to selectively transmit a signal according to each of sub areas included in a service area in order to avoid internal inter-cell interference in a wireless communication system.

Further, embodiments of the present invention disclose an apparatus and a method of forming a shadow area with respect to a predetermined service area existing within a service area of an eNB which transmits a signal by two dimensional beamforming.

Moreover, embodiments of the present invention disclose an apparatus and a method for measuring a downlink status by avoiding internal inter-cell interference by a UE located in a small service area which overlaps a macro service area.

Furthermore, embodiments of the present invention disclose a data transmission/reception apparatus and method for avoiding inter-multicell interference by a heterogeneous network in a planar massive MIMO system and increasing transmission capacity in the heterogeneous network.

TECHNICAL SOLUTION

In accordance with an aspect of the present invention, a method of forming M*N beams by an evolved NodeB (eNB) supporting signal transmission/reception in a macro service area in a heterogeneous network in which the macro service area is formed by M*N beams based on a two dimensional antenna array simultaneously considering a horizontal dimension and a vertical dimension and at least one small service area is formed in the macro service area is provided. The method includes: selecting at least one interference predicted beam formed to transmit a signal giving interference to a transmission signal in the at least one small service area among signals to be transmitted by the M*N beams; and performing beamforming on each of the M*N beams in consideration of inter-cell interference in the at least one small service area due to a signal to be transmitted by the at least one selected interference predicted beam.

In accordance with another aspect of the present invention, an evolved NodeB (eNB) supporting signal transmission/reception in a macro service area in a heterogeneous network in which the macro service area is formed by M*N beams based on a two dimensional antenna array simultaneously considering a horizontal dimension and a vertical dimension and at least one small service area is formed in the macro service area is provided. The eNB includes: a receiver that receives feedback information from User Equipments (UEs) located in the macro service area; a controller that selects at least one interference predicted beam formed to transmit a signal giving interference to a transmission signal in the at least one small service area among signals to be transmitted by the M*N beams based on the feedback information received by the receiver, and performs beamforming on each of the M*N beams in consideration of inter-cell interference in the at least one small service area due to a signal to be transmitted by the at least one selected interference predicted beam; and a transmitter that transmits signals by the M*N beams based on the beamforming performed by the controller.

In accordance with another aspect of the present invention, a method of reporting channel quality information by a User Equipment (UE) located in a small service area in a heterogeneous network in which the macro service area is formed by M*N beams based on a two dimensional antenna array simultaneously considering a horizontal dimension and a vertical dimension and at least one small service area is formed in the macro service area is provided. The method includes: estimating power (s) of a signal received from a small eNB serving the small service area, equal cell interference ($I\_{intra}$) external inter-cell interference ($I\_{inter,NoCoMP}$), and internal inter-cell interference ($I\_{inter,CoMP}$); configuring channel quality information by using the estimated received signal power (S), equal cell interference ($I\_{intra}$), external inter-cell interference ($I\_{inter,NoCoMP}$), and internal inter-cell interference ($I\_{inter,CoMP}$); and transmitting the configured channel quality information to the small eNB, wherein the internal inter-cell interference ($I\_{inter,CoMP}$) is estimated by an average of interference power by interference due to beams, which are not included in an interference beam index set provided by a macro eNB serving the macro service area, among the M*N beams.

In accordance with another aspect of the present invention, a User Equipment (UE) for forming a macro service area by M*N beams based on a two dimensional antenna array simultaneously considering a horizontal dimension and a vertical dimension and reporting channel quality information to a small eNB servicing a small service area in a heterogeneous network in which at least one small service area is formed in the macro service area, the UE being located in the small service area is provided. The UE includes: a controller that estimates channel quality information by using power (s) of a signal received from the eNB serving the small service area, equal cell interference ($I\_{intra}$), external inter-cell interference ($I\_{inter,NoCoMP}$), and internal inter-cell interference ($I\_{inter,CoMP}$), and configures channel quality information by using the estimated received signal power (S), equal cell interference ($I\_{intra}$), external inter-cell interference ($I\_{inter,NoCoMP}$), and internal inter-cell interference ($I\_{inter,CoMP}$); and a transmitter that transmits the configured channel quality information to the small eNB by a control of the controller, wherein the internal inter-cell interference ($I\_{inter,CoMP}$) is estimated by an average of interference power by interference due to beams, which are not included in an interference beam index set provided by a macro eNB serving the macro service area, among the M*N beams.

MODE FOR CARRYING OUT THE INVENTION

Hereinafter, the following detailed description will disclose representative embodiments to achieve the above described technical solution. Further, the same names of entities defined for the convenience of descriptions of the present invention may be used. However, the names used for the convenience of the descriptions do not limit the scope of the present invention, and may be applied to a system having a similar technical background through the same or easy modification.

Further, in the following description, a detailed description of known configurations or functions incorporated herein will be omitted when it is determined that the detailed description may make the subject matter of the present disclosure unclear.

The detailed description below discloses in detail a method of suppressing interference in a heterogeneous network in which a service area by at least one small eNB (small service area) overlaps a service area by a macro eNB (macro service area). A User Equipment (UE) belonging to the small eNB as a serving eNB (hereinafter, referred to as a "target UE") is a target to suppress interference due to a signal from the macro eNB in the small service area. It is premised that the macro eNB supports a service to a User Equipment (UE) located in the macro service area by two dimensional planar array antennas.

In the following detailed description below, in order to minimize interference in the target UI by a signal transmitted by the macro eNB, the macro eNB performs beamforming on the two dimensional planar array antennas. The beamforming is performed to form a shadow area of the small service area in which a transmission signal (Physical Downlink Control Channel: PDCCH or a Physical Downlink Shared Channel: PDSCH) of the macro eNB is not received.

For example, the macro eNB blocks signal transmission by at least one beam (hereinafter, referred to as "interference beam") to transmit a signal acting as interference to at least one target UE among beams (hereinafter, referred to as "two dimensional pattern beams:) sub-divided based on a horizontal dimension and a vertical dimension by two dimensional planar array antennas or perform beamforming to transmit minimum signals. For example, among column vectors of a precoding matrix for beamforming, a column vector corresponding to an interference beam is set as a weighted value which makes a signal not transmitted in the corresponding interference beam.

The macro eNB configures an interference beam index set by an index (hereinafter, referred to as an "interference beam index") for distinguishing at least one interference beam which cannot transmit a signal according to each small service area, and provide the configured interference beam index set to the target UE through the small eNB of the corresponding small service area or directly provide the configured interference beam index set to the target UE through a PDCCH or the like.

In another example, the macro eNB may configure an interference weight vector index set by an index (hereinafter, referred to as an "interference weight vector index") for distinguishing an interference weight vector, which is not the interference beam index, and provide the configured interference weight vector index set to the target UE through the small eNB of the corresponding small service area or directly provide the configured interference weight vector index set to the target UE through a PDCCH or the like. The interference weight vector index set is a union of interference weight vector indexes in which weighted values are set to block interference beams in a particular target UE or all target UEs among two dimensional pattern beams. The setting of the weighted value to block the interference beam means setting the weighted value to not allow signal transmission through the corresponding beam.

In order to configure the interference beam index set or the interference weight vector index set by the macro eNB, the target UE is required to report an index of at least one interference beam or an interference weight vector of the interference beam, which gives interference to the target UE, among two dimensional pattern beams to the macro eNB.

Meanwhile, the target UE having received the interference beam index set or the interference weight vector index set from the macro eNB does not consider interference due to a signal received by the interference beam by using the received interference beam index set or interference weight vector index set when a downlink channel state is measured. That is, the target UE may report channel state information (CQI) to avoid interference by the signal transmitted by the macro eNB to the small eNB.

Accordingly, the small eNB may provide resource scheduling to the target UE based on the measured CQI to avoid internal inter-cell interference. This enables efficient resource scheduling in CoMP, which becomes one reason to increase transmission capacity in the heterogeneous network.

For convenience, the following detailed description will be limited to an example implemented by the interference beam index and the interference beam index set to avoid interference. However, it is apparent that the following description may be applied to a case implemented using the interference weight vector index and the interference weight vector index set.

Meanwhile, in order to support technical features to be proposed, the following detailed description will disclose in detail an operation in which the macro eNB configures the interference beam index set by using the interference beam index fed back by the target UE and determines or configures a precoding matrix to be used for beamforming in consideration of the configured interference beam index set.

For example, at least one target UE located in the small service area by at least one small eNB estimates a downlink channel state by two dimensional pattern beams from the macro eNB and determines a beam of the macro eNB which generates inter-cell interference based on the estimated downlink channel state. At least one target UE feeds back information on the interference beam configured by at least one interference beam index determined based on the determination to the macro eNB. Accordingly, the macro eNB determines the interference beam index set, which is not used to avoid inter-cell interference, according to each small service area based on the feedback information from at least one target UE. However, it is also possible to determine the interference beam index set according to each target UE or an entire macro service area rather than according to each small service area. It may be required to support a technology for performing propagation while varying the range of the interference beam index set according to the corresponding range of the corresponding interference beam index set.

Further, an operation will be disclosed in detail in which the target UE having received the interference beam index set by the macro eNB avoids internal inter-cell interference to measure downlink channel quality and reports the measured channel quality to the small eNB.

For example, the macro eNB transfers the interference beam index set according to each small eNB to the target UE through a downlink signaling channel. Accordingly, the target UE may measure CQI for the downlink based on an assumption that the macro eNB does not use the beam included in the interference beam index set.

Lastly, an operation will be disclosed in detail in which the small eNB schedules resources for the target UE in the small service area in consideration of CQI corresponding to channel state information report from the target UE.

Hereinafter, disclosures required for technical features to be proposed will be described with reference to the accompanying drawings.

Figure 1:
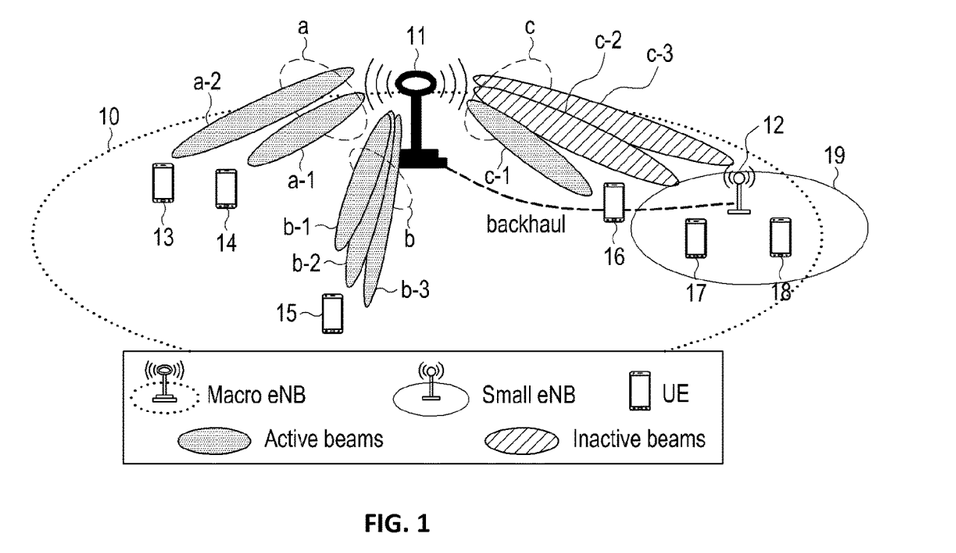
FIG. 1 illustrates a structure of a planar massive MIMO system based on a heterogeneous network according to an embodiment of the present invention.

FIG. 1 illustrates a structure of a planar massive MIMO system based on a heterogeneous network according to an embodiment of the present invention.

Since the planar massive MIMO system illustrated in FIG. 1 is based on the heterogeneous network, a small service area 19 by at least one small eNB 12 is distributed in a macro service area 10 by a macro eNB 11. The macro eNB 11 and at least one small eNB 12 are connected through a backhaul network. Here, when the macro eNB 11 and the small eNB 12 have different cell IDs, it corresponds to scenario 3 of Coordinated Multiple Point transmission and reception (coMP) defined in LTE-Advanced. When all eNBs, that is, the macro eNB 11 and the small eNB 12 have the same cell ID, it corresponds to scenario 4 of CoMP defined in LTE-Advanced. The heterogeneous network considered by the embodiment to be proposed considers both scenario 3 and scenario 4.

The macro eNB 11 has an antenna structure by a two dimensional planar array. For example, the macro eNB 11 has an antenna structure including a total of MN antenna elements consisting of M transmission antennas arranged in a horizontal dimension and N transmission antennas arranged in a vertical dimension. In general, the M transmission antennas arranged in the horizontal dimension form beams for UEs located in a rotational direction based on the macro eNB 11. For example, the array of antenna groups corresponding to reference numerals a, b, and c correspond to the array in the horizontal dimension.

Accordingly, the macro eNB 11 forms two dimensional pattern beams including M beams in a horizontal dimension and N beams in a vertical dimension by the MN antenna elements.

The N transmission antennas arranged in the vertical dimension form beams for UEs located in a direction from a short distance to a remote distance from the macro eNB 11. For example, the array of antennas within antenna groups corresponding to reference numerals a, b, and c correspond to the array in the vertical dimension.

Meanwhile, in the planar massive MIMO system, the macro eNB 11 precodes a signal into an MN×1 sized column vector included in an MN×MN 2D-DFT (Discrete Fourier Transform) precoding matrix U and transmits the precoded signal. One column vector included in the precoding matrix U corresponds to one beamforming weighted value. When beamforming (precoding) is performed using the beamforming weighted value, one beam for transmitting a signal may be formed in a wireless channel.

Accordingly, the weight vector and the beam have a one-to-one relation, and designating the beam may mean designating the weight vector forming the beam.

Meanwhile, the MN number of MN×1 column vectors $\{u_{m,n}\}_{m=1 \ldots M, n=1 \ldots N}$ included in U form a total of MN orthogonal transmission beams including M orthogonal transmission beams in a horizontal dimension and N orthogonal transmission beams in a vertical dimension in the two dimensional space. Accordingly, the MN orthogonal transmission beams formed in the planar massive MIMO system of the macro eNB 11 service the entire cell areas two-dimensionally divided into small areas such as M areas in a horizontal dimension and N areas in a vertical dimension.

Accordingly, when the transmission beam managing the corresponding small area is not formed (that is, when a weighted value of the corresponding transmission beam is not used for transmitting a signal), the signal of the macro eNB 11 is not transmitted in the corresponding small area. Through such an operation, a shadow region in which the signal by a PDCCH, a PDSCH, or the like of the macro eNB 11 is not transmitted may be formed in the small cell area of the small eNB 12 (that is, small service area). Accordingly, UEs 17 and 18 serviced by the small eNB 12 may avoid interference by the macro eNB 11.

Referring to FIG. 1, the macro eNB 11 provides a wireless communication service to UEs 13, 14, 15, and 16 located in the macro service area 10 which does not overlap the small service area 19. To this end, the macro eNB 11 forms MN orthogonal transmission beams a, b, and c, that is, two dimensional pattern beams, and each transmission beam divides an entirety of the macro service area 10 into two dimensional MN small areas by M divisions in a horizontal dimension and N divisions in a vertical dimension, thereby providing the wireless communication service.

The small eNB 12 provides the wireless communication service to the target UEs 17 and 18 located in the small service area 19. It may be assumed that the UEs 17 and 18 may receive data by different beams selected from N orthogonal beams arranged at an mth location in a horizontal dimension which are transmitted from the macro eNB 11. That is, it may be assumed that the UEs may receive data by Space Division Multiple Access (SDMA) in a vertical dimension.

In contrast, it may be assumed that that the UE 15 located in the macro service area 10 receives data by Spatial Multiplexing (SM) by three beams selected from N orthogonal beams arranged at an $m^{th}$ location in a horizontal dimension which are transmitted by the macro eNB 11.

The UEs 16, 17, and 18 can receive signals with a high channel gain by three orthogonal beams included in a beam group corresponding to reference numeral c which are located at the same position in the horizontal dimension but different locations in the vertical dimension. However, the target UEs 17 and 18 located in the small service area 19 should receive the wireless communication service from the small eNB 12, so that macro eNB 11 does not use the beam which provides a maximum channel gain (that is, maximum interference) to the target UEs 17 and 18 among the beams within the beam group corresponding to reference numeral c in order to minimize interference giving the influence to the target UEs 17 and 18. That is, the corresponding interference beam is formed as a zero power beam.

Accordingly, the target UEs 17 and 18 receive signals having suppressed internal inter-cell interference, which are received from the macro eNB 11, thereby calculating CQI for the signal having the suppressed internal inter-cell interference. Further, the target UEs 17 and 18 may feedback the CQI calculated by the signal having the suppressed internal inter-cell interference to the small eNB 12. Accordingly, the small eNB 12 may reflect an effect of avoiding the internal inter-cell interference when determining resource scheduling for the target UEs 17 and 18 and a Modulation and Coding Scheme (MCS). This will become one reason to increase transmission capacity of the small eNB 12.

Meanwhile, as described above, the macro eNB 11 should receive feedback of information on the interference beam (for example, interference beam index) acting as internal inter-cell interference from target UEs 13, 14, 15, 16, 17, 18, particularly, the target UEs 17 and 18 located in the small service area 19 in order to perform scheduling to avoid the internal inter-cell interference. In order to avoid the internal inter-cell interference based on interference beam indexes fed back from the target UEs 17 and 18, the macro eNB 11 may determine an interference beam index set by a weighted value, which will be not used, or a zero power beam.

Further, the macro eNB 11 shares the determined interference beam index set with the target UEs 17 and 18. Accordingly, the target UEs 17 and 18 may estimate CQI having suppressed main interference by the macro eNB 11 by using information on an inactive beam transferred by the macro eNB 11 and feedback the estimated CQI to the small eNB 12.

Figure 2:
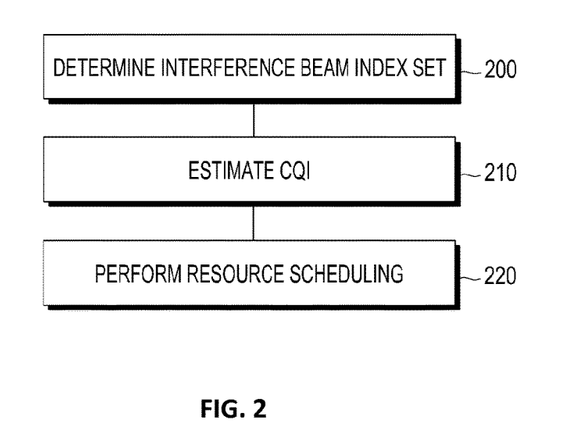
FIG. 2 illustrates a process of performing resource scheduling for a small service area in the planar massive MIMO system based on the heterogeneous network according to an embodiment of the present invention.

FIG. 2 illustrates a process of performing resource scheduling for the small service area in the planar massive MIMO system based on the heterogeneous network according to an embodiment of the present invention.

Referring to FIG. 2, the macro eNB determines an interference beam index set for each of at least one small service area by using information (interference beam index or the like) fed back by the target UEs located in the macro service area or the target UEs located in at least one small service area which overlaps the macro service area in step 200.

For example, the macro eNB configures the interference beam index set in the corresponding small service area by adding interference beam indexes reported by at least one target UE located in each small service area. The interference beam index set configured according to each small service area is provided to the target UE located in the corresponding small service area by the macro eNB. For example, the macro eNB may provide the configured interference beam index set to the target UE through the small eNB connected by a backbone or directly provide the configured interference beam index set to the target UE through a PDCCH or the like.

Meanwhile, the macro eNB may set a column vector corresponding to the interference beam among column vectors included in a precoding matrix for beamforming to block signal transmission by the interference beam included in the interference beam index set.

The target UE ignores the signal received by the corresponding interference beam by using the interference beam index set provided by the macro eNB among the received signal and measures a downlink channel state by the remaining signals in step 210. Further, the target UE reports CQI corresponding to the measured channel state to the small eNB. That is, the target UE may measure CQI to avoid the internal inter-cell interference in consideration of the interference beam index set when measuring the downlink channel state.

The small eNB perform scheduling for allocating resources to the target UE by using the CQI information reported from the target UE located in the small service area in which the small eNB provides the wireless communication service.

Figure 3:
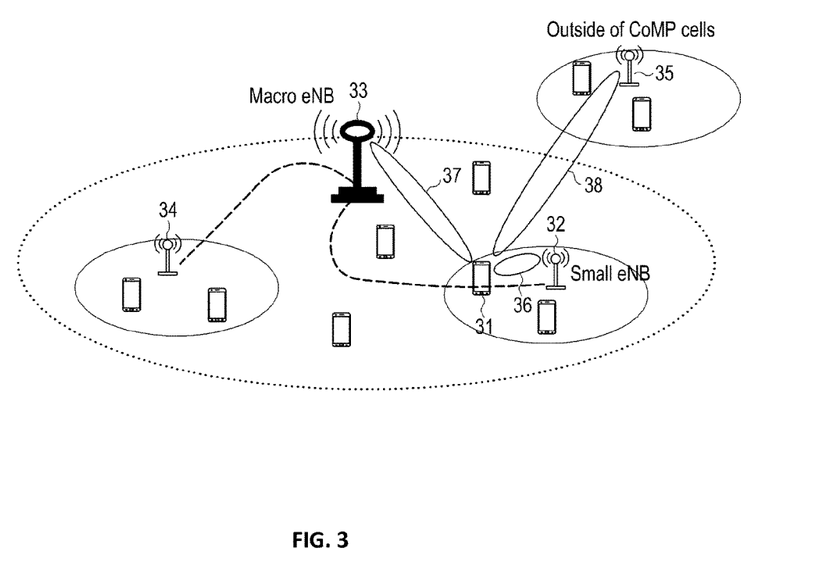
FIG. 3 illustrates an example of measuring channel quality of the small service area in the planar massive MIMO system based on the heterogeneous network according to an embodiment of the present invention.

FIG. 3 illustrates an example of measuring channel quality of the small service area in the planar massive MIMO system based on the heterogeneous network according to an embodiment of the present invention. In FIG. 3, it is assumed that there are two small eNBs 32 and 34, a macro eNB 33 (hereinafter, referred to as a "source macro eNB") connected to the two small eNBs 32 and 34 through a backbone network, and one neighboring macro eNB 35 (outside of CoMP cell) adjacent to the source macro eNB 33. At this time, it is assumed that a signal transmitted by the outside of CoMP cell 35 influences the target UE 31 located in the small service area by the small eNB 32. That is, the two small eNBs 32 and 34 and the macro eNB 33 configure one CoMP connected through the backbone and the outside of CoMP cell 35 does not belong to the CoMP.

Referring to FIG. 3, the target UE 31 estimates channel quality for downlink with the small eNB 32 by power of a received signal 36, equal cell interference, external inter-cell interference 38, and internal inter-cell interference 37. For example, the channel quality estimated for the downlink may be a Signal-to-Interference and Noise Ratio (SINR).

Particularly, the target UE 31 estimates equal cell interference based on the interference beam index set received from the macro eNB 33, and thus estimate CQI to avoid the inter-cell interference within CoMP.

Figure 4:
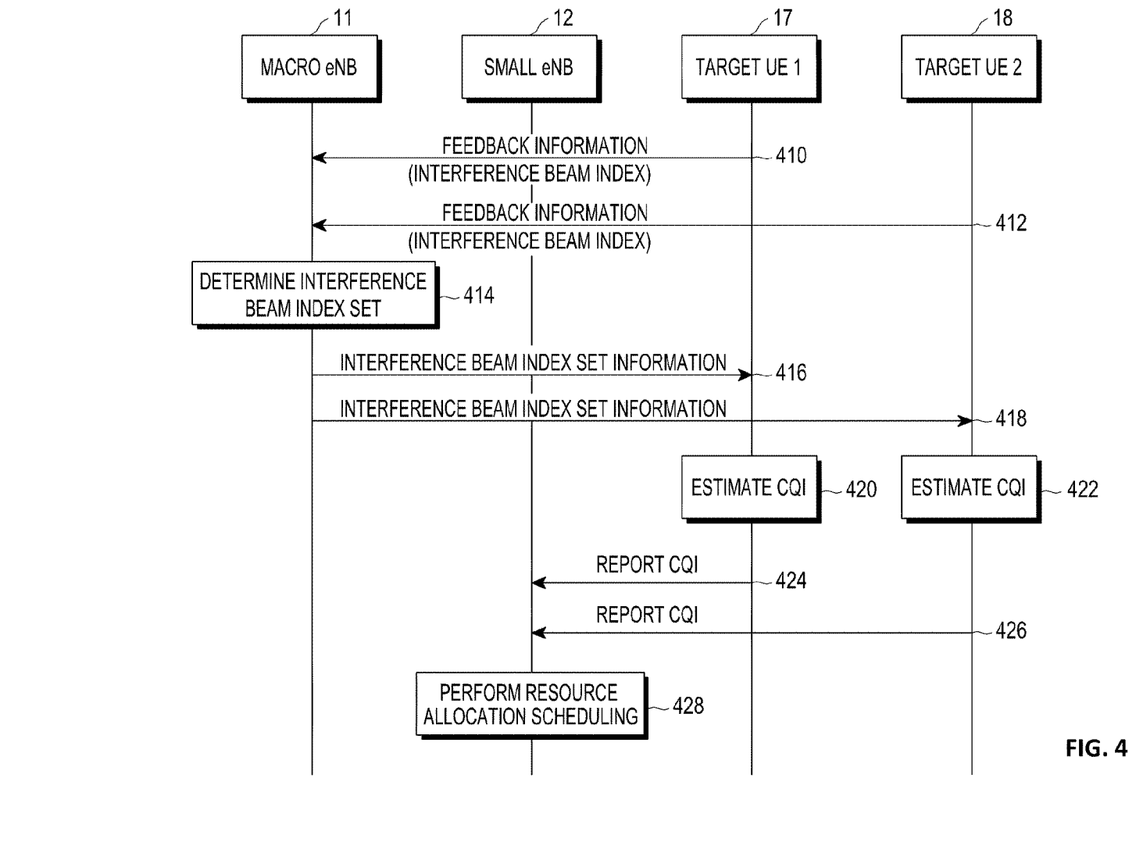
FIG. 4 illustrates a signal processing process of performing resource scheduling for the small service area in the planar massive MIMO system based on the heterogeneous network according to an embodiment of the present invention.

FIG. 4 illustrates a signal processing process for performing resource scheduling for the small service area in the planar massive MIMO system based on the heterogeneous network according to an embodiment of the present invention. FIG. 4 assumes an environment in which two target UEs exist in one small service area within one macro service area. However, the present invention is not limited to the environment assumed by an operation according to proposed technical features. That is, it is apparent that a condition where a plurality of small eNBs exist in one macro service area or one or more target UEs are located in each small eNB may be applied to all cases in common.

Additionally, one macro service area may be adjacent to another macro service area and, at this time, a signal in the other macro service area may act as interference for the small service area.

Referring to FIG. 4, target UEs #1 and #2 17 and 18 receive signals transmitted through two dimensional pattern beams by the macro eNB 11 and determine at least one interference beam index based on the received signals. Target UEs #1 and #2 17 and 18 configure feedback information based on at least one determined interference beam index and report the configured feedback information to the macro eNB 11 in steps 410 and 412.

Figure 5:
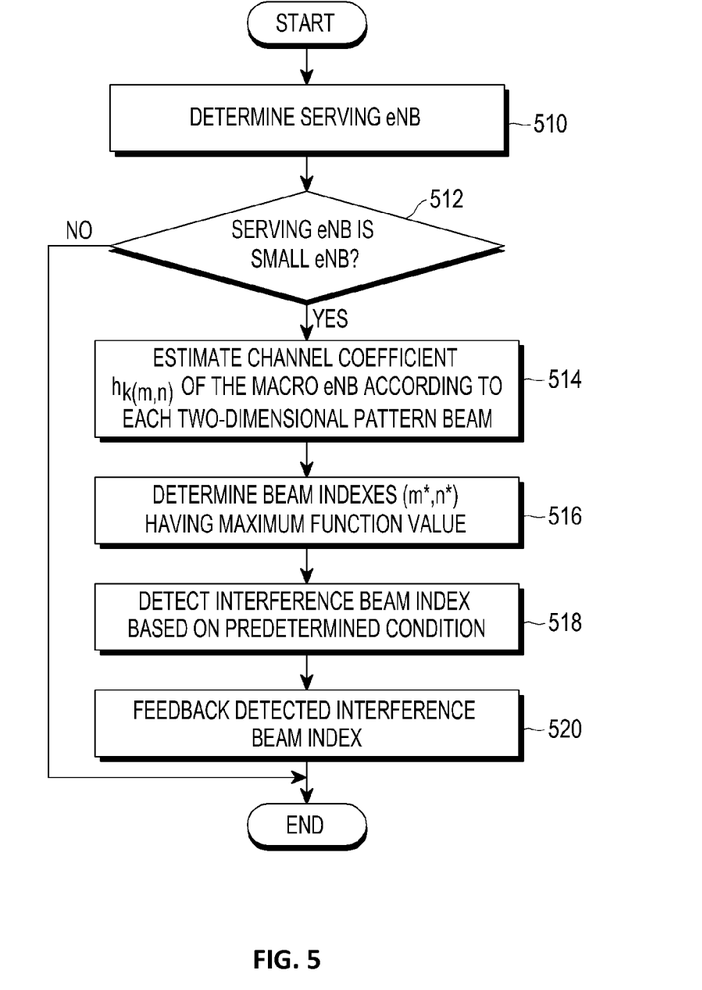
FIG. 5 illustrates a control flow performed to configure feedback information and to report the configured feedback information to a macro eNB by a target UE according to an embodiment of the present invention.

For example, a control flow performed to configure feedback information and to report the feedback information to the macro eNB by the target UE is illustrated in FIG. 5. In FIG. 5, the macro eNB and small eNBs in the heterogeneous network consider transmission of orthogonal channel state identifiers—Channel State Indicator-Reference Signals (CSI-RS). This is to distinguish between and estimate downlink channel states of the macro eNB and the small eNB by the target UE.

Referring to FIG. 5, the target UE determines a serving eNB to communication with the target UE in step 510. For example, the target UE may estimate a downlink channel state of each eNB based on orthogonal CSI-RSs of the macro eNB 11 and the small eNB 12 and determine the serving eNB by a result of the estimation. For example, when considering the downlink channel state according to each eNB estimated by the CSI-RS, the target UE may determine the eNB, which is admitted to have the best channel state, as the serving eNB.

The target UE determines whether the previously determined serving eNB is the small eNB in step 512. That is, the target UE determines whether the target UE is currently located in the small service area. For example, since the target UE can identify the corresponding eNB by the CSI-RS, the target UE may determine whether the small eNB is selected as the serving eNB by the CSI-RS considered to determine the serving eNB.

When it is determined that the target UE is located in the macro service area rather than the small service area, the target UE may perform an operation according to resource scheduling defined by a general process required by the macro eNB.

However, when it is determined that the target UE is located in the small service area, the target UE may perform the following operation to measure CQI in the small service area while avoiding interference due to the signal transmitted from the macro eNB.

More specifically, when the small eNB is determined as the serving eNB, the target UE estimates a channel coefficient $\tilde{h}_{k,(m,n)}$ corresponding to each two dimensional beam formed by the macro eNB in step 514.

For example, the target UE estimates a downlink channel with the macro eNB by using the CSI-RS received from the macro eNB. When the macro eNB transmits the orthogonal CSI-RS according to each two dimensional pattern beam (transmission antenna), the target UE estimates a channel vector $h_k$ for 1×MN downlinks formed between MN transmission antennas and reception antennas of the target UE through the estimation of the CSI-RS of the macro eNB.

Based on equation (1) below, the target UE may calculate a downlink channel response $\tilde{h}_{k,(m,n)}$ which can be received by the beam located at an mth position in a horizontal dimension and an nth position in a vertical dimension in the two dimensional beam space which is formed by a precoding vector $u_{m,n}$ using the estimated channel vector $h_k$.

$$\tilde{h}_{(k,(m,n))} = h_k u_{(m,n)}, m=1 \ldots M, n=1 \ldots N \qquad (1)$$

In Equation (1) above, it is assumed that the target UE uses one reception antenna.

Further, when the macro eNB transmits the CSI-RS after precoding with column vectors of the size of MN×1 of the MN×MN 2D-DFT precoding matrix U, that is, performing beamforming, the target UE may directly estimate, from MN transmission beams, a 1×MN downlink channel vector $\tilde{h}_{k,(m,n)}$ to the reception antenna of the UE through the CSI-RS estimation.

When the estimation for the downlink channel vector $\tilde{h}_{k,(m,n)}$ is completed, the target UE determines a beam index having a maximum function value by the downlink channel vector $\tilde{h}_{k,(m,n)}$ of which the estimation has been completed in step 516. For example, the target UE compares result values of a predetermined function f(.) having an input of MN channel coefficients $\{\tilde{h}_{k,(m,n)}\}_{m=0 \ldots M-1, n=0 \ldots N-1}$ and selects two dimensional indexes m*, n* of a beam having a maximum result value through the comparison. That is, the horizontal beam index m* and the vertical beam index n*, which make the result value of the function f(.) maximum, are calculated.

An example thereof is defined in equation (2) below.

$$(m^*, n^*) = \underset{m=0 \ldots M-1, n=0 \ldots N-1}{\operatorname{argmax}} f(\tilde{h}_{k,(m,n)}) \qquad (2)$$

In equation (2), a predetermined function f(.) may be defined by a function such as the size $|\tilde{h}_{k,(m,n)}|$ of a channel coefficient $\tilde{h}_{k,(m,n)}$ or a data rate at which transmission can be made by the channel coefficient $\tilde{h}_{k,(m,n)}$, and a Signal-to- Interference and Noise Ratio (SINR) with which transmission can be made by the channel coefficient $\tilde{h}_{k,(m,n)}$.

The target UE detects an interference beam index, which meets a predetermined condition, by using the channel coefficient $\tilde{h}_{k,(m,n)}$ estimated according to each two dimensional pattern beam and the two dimensional indexes m*, n* of the beam having the previously determined maximum result value (hereinafter, referred to as a "maximum result beam index") in step 518.

For example, the target UE sequentially selects two dimensional pattern beams and, if a result value (hereinafter, referred to as an "estimated function result value") when the channel coefficient estimated for the selected beam is substituted in the predefined function f(.) meets a preset threshold value, determines the selected beam as an interference beam.

For example, the preset threshold value may be determined by a predetermined multiple of the channel coefficient $\tilde{h}_{k,(m^*,n^*)}$ (hereinafter, referred to as a "maximum result beam channel coefficient") estimated for the beam of the maximum result beam indexes m*, n*. That is, a beam index, which makes the estimated function result value $f(\tilde{h}_{k,(m,n)})$ of the sequentially selected beams a value $\alpha_{th}$ times larger than or equal to a result value $f\tilde{h}_{k,(m^*,n^*)}$ (hereinafter, referred to as an "estimated maximum function result value") when the maximum result beam channel coefficient is substituted into the predefined function f(.), is included in the inter-cell interference beam index set $\mathcal{J}_{i,k}$ of the macro eNB which gives high interference to a $k^{th}$ UE belonging to an $i^{th}$ small eNB.

Equation (3) below defines an example for selecting indexes of the beam to be included in the inter-cell interference beam index set $\mathcal{J}_{i,k}$ of the macro eNB.

$$(m, n) \in \mathcal{J}_{i,k}, \text{ if } \frac{f(\tilde{h}_{k,(m,n)})}{f(\tilde{h}_{k,(m^*,n^*)})} \geq \alpha_{th} \qquad (3)$$

The definition in equation (3) above is performed with respect to all of a total of MN two-dimensional pattern beams.

Meanwhile, a parameter $\alpha_{th}$ required for determining the inter-cell interference beam index set $\mathcal{J}_{i,k}$ may be defined as a common value for all target UEs or different values depending on the target UEs. The parameter $\alpha_{th}$ may be prearranged through the standard to be shared between the eNB and target UEs, or may be transferred to all target UEs through downlink Radio Resource Control (RRC) signaling by the eNB.

When the detection for at least one interference beam index is completed, the target UE configures feedback information including the detected interference beam index and provides the configured feedback information to the macro eNB in step 520.

For example, the target UE feeds back the interference beam index set $\mathcal{J}_{i,k}$ of the macro eNB, which gives high inter-cell interference to the target UE ($k^{th}$ UE belonging to an $i^{th}$ small eNB) to the macro eNB via the $i^{th}$ small eNB.

Through the above described operation, the macro eNB 11 having received the feedback information from each of the target UEs 17 and 18 determines the interference beam index set by a union of the interference beam indexes included in the received feedback information. At this time, the macro eNB 11 may configure the interference beam index set according to each target UE or according to each small eNB 12, or configure the interference beam index set for all UEs located within the macro service area. Accordingly, the macro eNB 11 may apply different ranges of the target feedback information for the union based on which scheme will be used for configuring the interference beam index set.

For example, the macro eNB 11 may configure the interference beam index set according to each target UE. That is, the macro eNB 11 determines an interference beam index set $\mathcal{J}_i$, which gives high interference to the $i^{th}$ small service area, by using the inter-cell interference beam index set $\mathcal{J}_{i,k}$, which gives high interference to the $k^{th}$ UE belonging to the $i^{th}$ small eNB fed back from each of the UEs 17 and 18.

Equation (4) below shows an example of determining the interference beam index set $\{\mathcal{J}_{i,k}\}_{k=1\ldots K}$ for the $i^{th}$ small eNB by the union of the interference beam index set $\mathcal{J}_i$ reported by $i^{th}$ each of K target UEs belonging to the $i^{th}$ small eNB.

$$\mathcal{J}_i = \mathcal{J}_{i,1} \cup \mathcal{J}_{i,2} \ldots \cup \mathcal{J}_{i,K} \qquad (4)$$

The interference beam index set $\mathcal{J}_i$ determined as described above may be transferred to the target UEs 17 and 18 belonging to the $i^{th}$ small eNB as the serving eNB via the $i^{th}$ small eNB 12 by the macro eNB 11 or directly transferred to the target UEs 17 and 18 belonging to the $i^{th}$ small eNB as the serving eNB by the macro eNB 11 in steps 416 and 418.

In another example, the macro eNB 11 may configure the interference beam index set according to each small eNB. That is, the macro eNB 11 determines all interference beam index sets $\mathcal{J}$ by the union of the interference beam index set $\mathcal{J}_i$, which gives high interference in each small service area, by using the inter-cell interference beam index set $\mathcal{J}_{i,k}$ fed back from all target UEs.

In other words, the macro eNB 11 determines the interference beam index set $\mathcal{J}$, which gives high inter-cell interference in all small service areas (I small service areas), by using the inter-cell interference beam index set $\mathcal{J}_i$ which gives high inter-cell interference in the $i^{th}$ small service area.

For example, the macro eNB 11 determines the union of the interference beam index set $\{\mathcal{J}_i\}_{i=1\ldots I}$ of the $i^{th}$ small eNB and configures all interference beam index sets $\mathcal{J}$ by the union of the unions in all the determined small service areas.

Equation (5) below shows an example of determining the interference beam index set $\mathcal{J}$ for all macro service areas by the union of the interference beam index set $\{\mathcal{J}_{i,k}\}_{k=1\ldots K}$ reported by each of the target UEs belonging to the I small eNBs located in the macro service area as the serving eNBs, respectively.

$$\mathcal{J} = \mathcal{J}_1 \cup \mathcal{J}_2 \ldots \cup \mathcal{J}_I \qquad (5)$$

The interference beam index set $\mathcal{J}$ determined as described above may be transferred to the target UEs 17 and 18 belonging to the $i^{th}$ small eNB as the serving eNB via the $i^{th}$ small eNB 12 by the macro eNB 11 or directly transferred to all UEs located in the macro service area by the macro eNB 11 in steps 416 and 418.

Through steps 410 to 418, the macro eNB may determine the interference beam index set, and an operation for sharing the determined interference beam index set with UEs may be periodically performed every TTI or aperiodically performed when the interference beam index set $\{\mathcal{J}_{i,k}\}_{i=1\ldots I, k=1\ldots K}$ of the UEs is changed.

Each of the target UEs 17 and 18 having received the interference beam index set $\{\mathcal{J}_{i,k}\}_{i=1\ldots I, k=1\ldots K}$ estimates downlink channel quality from the serving eNB, that is, the small eNB 12 by suppressing interference by the macro eNB 11 in consideration of the received interference beam index set $\{\mathcal{J}_{i,k}\}_{i=1\ldots I, k=1\ldots, K}$ in steps 420 and 422.

For example, the macro eNB 11 considers transmission of a PDCCH and a PDSCH after precoding with each of column vectors of the size of MN×1 of the MN×MN 2D-DFT precoding matrix U, that is, beamforming.

At this time, the macro eNB 11 does not use beams included in the interference beam index set $\mathcal{J}$, which gives inter-cell interference to all small service areas, thereby avoiding inter-cell interference influencing target UEs belonging to the small eNB. Due to the interference avoidance operation, it is possible to reduce an amount of inter-cell interference, which target UEs experience, and thus increase the received SINR.

In order to expand the increase in the received SINR of the target UE to an increase in transmission capacity, when scheduling to determine the target UE which will transmit data and an MCS of a data column to be transmitted to the scheduled target UE, the determination should be made based on the received SINR in which the inter-cell interference of the corresponding target UE is avoided.

To this end, each target UE calculates CQI for a case where inter-cell interference received from the macro eNB is avoided and feeds back the CQI, so that the macro eNB may perform scheduling and MCS determination based on the feedback.

Figure 6:
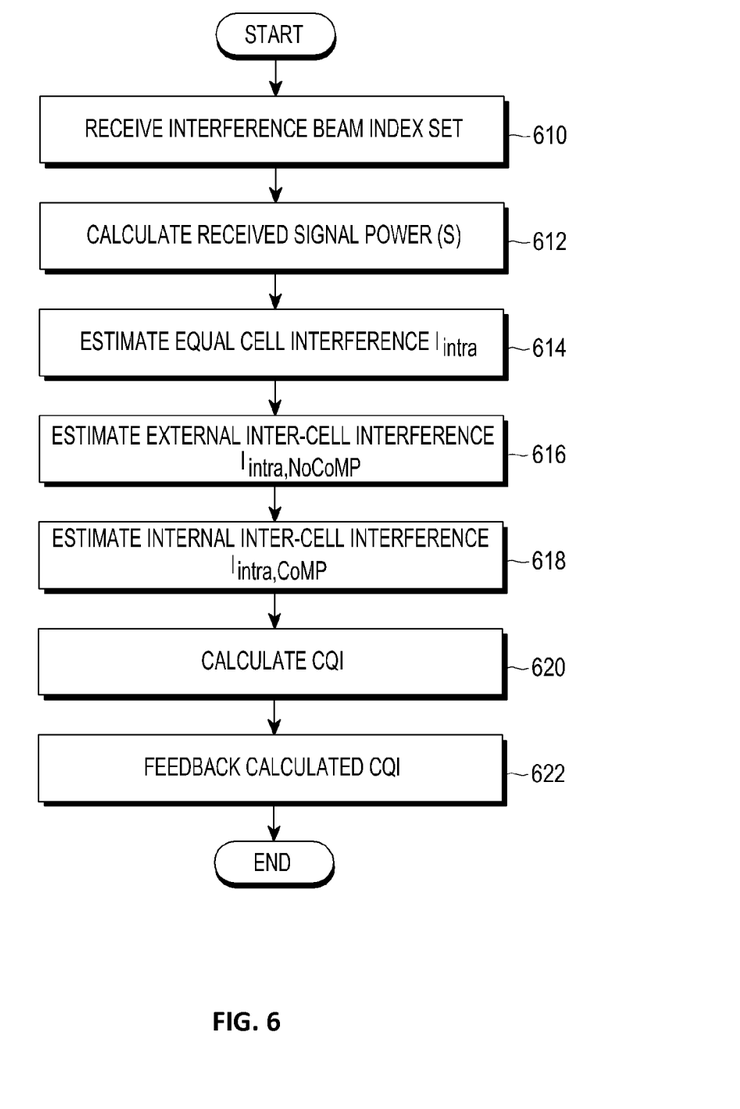
FIG. 6 illustrates a control flow performed to measure downlink channel quality with the small eNB and to report the measured channel quality to the small eNB by the target UE according to an embodiment of the present invention.

For example, FIG. 6 illustrates a control flow performed to measure downlink channel quality with the small eNB and to report the measured channel quality to the small eNB by the target UE.

Referring to FIG. 6, the target UE receives the interference beam index set by the macro eNB. As described above, the interference beam index set may be directly provided by the macro eNB or may be provided through the small eNB corresponding to the serving eNB of the target UE in step 610.

The target UE estimates power S of the received signal in step 612. For example, the target UE may estimate received signal power S by using only signals received from the serving eNB.

For example, the target UE estimates a downlink channel with the serving eNB through the CSI-RS received from the serving eNB, and estimates the received signal power S by multiplying a Precoding Matrix index (PMI) selected by the target UE in the downlink channel and a precoding vector indicated by a Rank Indicator (RI).

The target UE estimates interference within the small service area due to the signal transmitted from the serving eNB, that is, equal cell interference $I_{ultra}$ in step 614. For example, the equal cell interference $I_{intra}$ is generated from different data columns which are simultaneously transmitted by Spatial Multiplexing (SM) or SDMA.

For example, the target UE may estimate equal cell interference $I_{intra}$ by multiplying a weighted vector used for transmission of a data column influencing the downlink channel estimated for the serving eNB.

The target UE estimates external inter-cell interference $I_{inter,NoCoMP}$ received from the neighboring macro eNB located in the outside, which is not the eNB belonging to the same CoMP in step 616. For example, in LTE-A Rel-11, an Interference Measurement Resource (IMR) is defined to accurately measure inter-cell interference. The IMR refers to a set of REs which transmit a zero power CSI-RS, that is, a set of REs which do not transmit a CSI-RS among REs allocated for CSI-RS transmission. Accordingly, the macro eNB and the small eNB belonging to CoMP do not transmit the CSI-RS in the same IMR and measure the size of the signals received in the corresponding IMR, so as to measure an amount of interference received from eNBs, which do not belong to CoMP, that is, $I_{inter,NoCoMP}$.

The target UE estimates internal cell-interference $I_{inter,CoMP}$ due to the signal received from the macro eNB within CoMP in step 618. At this time, the target UE should accurately estimate $I_{inter,CoMP}$ in which internal inter-cell interference is suppressed by the internal inter-cell interference avoidance scheme. To this end, the target UE uses the interference beam index set provided by the macro eNB within CoMP.

For example, the target UE estimates a downlink channel with the macro eNB through the CSI-RS received from the macro eNB within CoMP, and estimates interference power by the corresponding beam by multiplying the estimated downlink channel and the weighted vector used by the macro eNB.

Accordingly, under an assumption that the internal macro eNB does not use beams included in the interference beam index set $\mathcal{J}$ among a total of MN transmission beams, the target UE calculates $I_{inter,CoMP}$ as shown in equation (7) below.

$$I_{inter,CoMP} = \mathrm{avg}(\{r_{m,n}\}_{m=0\ldots M-1, n=0\ldots N-1, \text{ and } (m,n)\in \mathcal{J}}) \qquad (6)$$

In the above equation, $r_{m,n}$ denotes interference which the target UE receives by a $(m,n)^{th}$ beam of the internal macro eNB, and $\mathrm{avg}(\mathcal{D})$ denotes an average of D set elements.

Accordingly, the target UE calculates $I_{inter,CoMP}$ based on the average of interference power by the $(m,n)^{th}$ beam which is not included in the interference beam index set $\mathcal{J}$.

The target UE calculates downlink channel quality with the serving eNB by using the received signal power S, the equal cell interference $I_{intra}$, the external inter-cell interference $I_{inter,NoCoMP}$, and the internal inter-cell interference $I_{inter,CoMP}$, which are calculated and estimated through the above described steps in step 620. That is, the target UE calculates CQI for the signal received from the serving eNB while avoiding interference by the internal macro eNB.

Equation (7) below shows an example of calculating the SINR Y which represents the channel quality with the serving eNB.

$$\gamma = \frac{S}{I_{intra} + I_{inter,CoMP} + I_{inter,NoCoMP} + N} \qquad (7)$$

In the above equation, N denotes a degree of noise received by the target UE.

The target UE reports information on the calculated channel quality to the serving eNB in step 622. FIG. 4 illustrates an operation in which each of the target UEs 17 and 18 report the estimated CQI to the small eNB 12 in response to the report in steps 424 and 426.

Through the above described operation, the small eNB 12 having received the report of the CQI from each of the target UEs 17 and 18 performs a scheduling operation for resource allocation based on the received CQI in step 428.

For example, the small eNB performs scheduling based on the CQI, in which internal inter-cell interference is avoided, fed back by each of the target UEs 17 and 18 with respect to the target UEs 17 and 18 belonging to the small eNB as the serving eNB. Accordingly, the small eNB 12 may transmit a PDCCH and a PDSCH with the MCS suitable for the corresponding CQI to the target UEs 17 and 18. By not allocating the beams included in the interference beam index set $\mathcal{J}$ determined by the macro eNB 11 when scheduling is performed, the beams may be not used when the PDCCH and the PDSCH are transmitted.

Accordingly, since the signal of the macro eNB is not transmitted in the area managed by the beams included in $\mathcal{J}$, CoMP internal inter-cell interference experienced by the target UEs belonging to the small eNB of the corresponding area can be sufficiently avoided.

Further, a technology for estimating the CQI in which the proposed CoMP internal inter-cell interference is avoided makes a restriction such that the weighted vectors, which are not used by the interference avoidance technology performed by the macro eNB, are excluded from the interference weighted vector set which should be considered when the UE estimates inter-cell interference. In addition, the proposed CQI estimation technology may accurately reflect a decrease in the amount of the inter-cell interference by the CoMP internal interference avoidance technology in the CQI estimation to increase transmission capacity of CoMP.

While the present disclosure has been described in detail with reference to specific embodiments thereof, it will be apparent that various changes and modifications may be made thereto by those skilled in the art without departing from the scope of the present disclosure. Thus, the scope of the present invention shall not be determined merely based on the described exemplary embodiments and rather determined based on the accompanying claims and the equivalents thereto. In addition, these changes and modifications should not be individually understood from the technical spirit or prospect of the present disclosure.

What is claimed:

1. A method for beamforming by an evolved NodeB (eNB) in a heterogeneous network in which a macro service area is managed by the eNB and at least one small service area is managed by at least one small eNB within the macro service area, the method comprising:

receiving, from user equipments (UEs) served by the eNB in the macro service area and UEs served by the at least one small eNB in the at least one small service area, feedback information related to signals transmitted on a plurality of beams formed by a two-dimensional antenna array of the eNB, feedback information received from each UE served by the at least one small eNB in the at least one small service area comprising at least one interference beam index of at least one interference beam interfering with each UE in the at least one small service area among the plurality of beams of the eNB;

determining, based on the feedback information, at least one interference beam index of at least one interference beam interfering with at least one small eNB of the at least one small service area among the plurality of beams;

configuring a set of interference beam indexes for each of the at least one small eNB by using the determined at least one interference beam index;

determining a weighted vector of beamforming for the plurality of beams in consideration of the set of interference beam indexes for each of the at least one small eNB;

configuring a precoding matrix for beamforming to have the weighted vector as a column vector;

performing beamforming of the plurality of beams using the precoding matrix by determining to not use at least one beam corresponding to the set of interference beam indexes;

transmitting, to the UEs located in the macro service area and the UEs located in the at least one small service area, the set of interference beam indexes at every transmission time interval (TTI); and receiving, via the at least one small eNB from each of the UEs located in the at least one small service area, channel quality information determined based on inter-cell interference estimated using an average interference power occurred by remaining beams except for at least one interference beam corresponding to the set of interference beam indexes.

2. The method of claim 1, further comprising:
transmitting, to the UEs, a changed set of interference beam indexes when the set of interference beam indexes is changed.

3. An evolved NodeB (eNB) for beamforming in a heterogeneous network in which a macro service area is managed by the eNB and at least one small service area is managed by at least one small eNB within the macro service area, the eNB comprising:

a two-dimensional antenna array configured to form a plurality of beams;

a transceiver configured to receive, from user equipments (UEs) served by the eNB in the macro service area and UEs served by the at least one small eNB in the at least one small service area, feedback information related to signals transmitted on the plurality of beams formed by the two-dimensional antenna array, feedback information received from each UE served by the at least one small eNB in the at least one small service area comprising at least one interference beam index of at least one interference beam interfering with each UE in the at least one small service area among the plurality of beams of the eNB; and a controller configured to:
determine, based on the feedback information, at least one interference beam index of at least one interference beam interfering with at least one small eNB of the at least one small service area among the plurality of beams, configure a set of interference beam indexes for each of the at least one small eNB by using the determined at least one interference beam index, determine a weighted vector of beamforming for the plurality of beams in consideration of the set of interference beam indexes for each of the at least one small eNB, configure a precoding matrix for beamforming to have the weighted vector as a column vector, perform beamforming of the plurality of beams using the precoding matrix by determining to not use at least one beam corresponding to the set of interference beam indexes, control the transceiver to transmit, to the UEs located in the macro service area and the UEs located in the at least one small service area, the set of interference beam indexes at every transmission time interval (TTI), and control the transceiver to receive, via the at least one small eNB from each of the UEs located in the at least one small service area, channel quality information determined based on an internal inter-cell interference estimated using an average interference power occurred by remaining beams except for at least one interference beam corresponding to the set of interference beam indexes.

4. The eNB of claim 3, wherein the controller is configured to control the transceiver to transmit, to the UEs, a changed set of interference beam indexes when the set of interference beam indexes is changed.

* * * * *